United States Patent
Kawano et al.

(10) Patent No.: US 7,173,236 B2
(45) Date of Patent: Feb. 6, 2007

(54) ROTARY ELECTRIC COMPONENT INCLUDING A ROTATABLY SUPPORTING CASE AND OPERATION PANEL USING THE SAME

(75) Inventors: Kenji Kawano, Miyagi-ken (JP); Hiroyuki Sato, Miyagi-ken (JP); Masaaki Tanaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 212 days.

(21) Appl. No.: 11/048,414

(22) Filed: Feb. 1, 2005

(65) Prior Publication Data
US 2005/0173624 A1  Aug. 11, 2005

(30) Foreign Application Priority Data
Feb. 10, 2004  (JP) .............................. 2004-033955

(51) Int. Cl.
*G01D 5/34* (2006.01)
(52) U.S. Cl. .............................. 250/231.13; 250/231.15
(58) Field of Classification Search ........... 250/231.13, 250/231.15, 231.16; 341/11, 13
See application file for complete search history.

(56) References Cited

U.S. PATENT DOCUMENTS 6,130,425 A * 10/2000 Sano ...................... 250/231.14

FOREIGN PATENT DOCUMENTS

JP     39-12286    5/1939
JP     2001-243848    9/2001

* cited by examiner

*Primary Examiner*—Que T. Le
(74) *Attorney, Agent, or Firm*—Brinks Hofer Gilson & Lione

(57) ABSTRACT

A rotary electric component includes a case for accommodating a rotary body having a cylindrical operation portion and for rotatably supporting the rotary body and a substrate having a rotation detecting means linked to the rotary body at a lower portion of the case. A guide groove whose distance from the center of rotation of the rotary body is continuously changed is formed in a bottom surface of the rotary body. The rotary detecting means of the substrate has a sliding portion fitted to the guide groove of the rotary body to slide according to the rotation of the rotary body, and outputs a signal according to a movement location of the sliding portion.

7 Claims, 3 Drawing Sheets

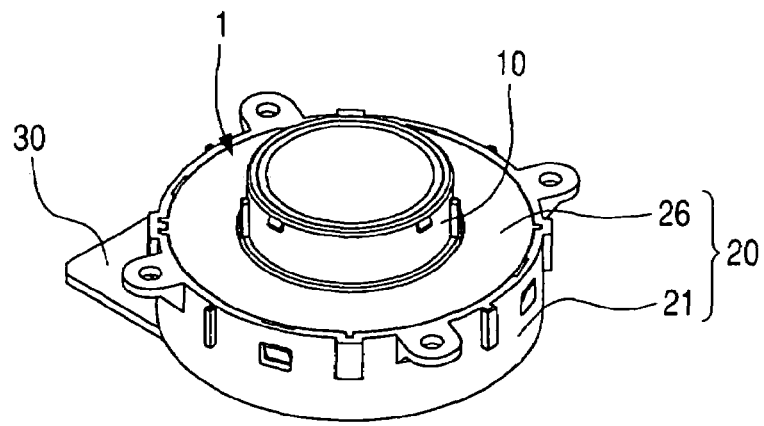
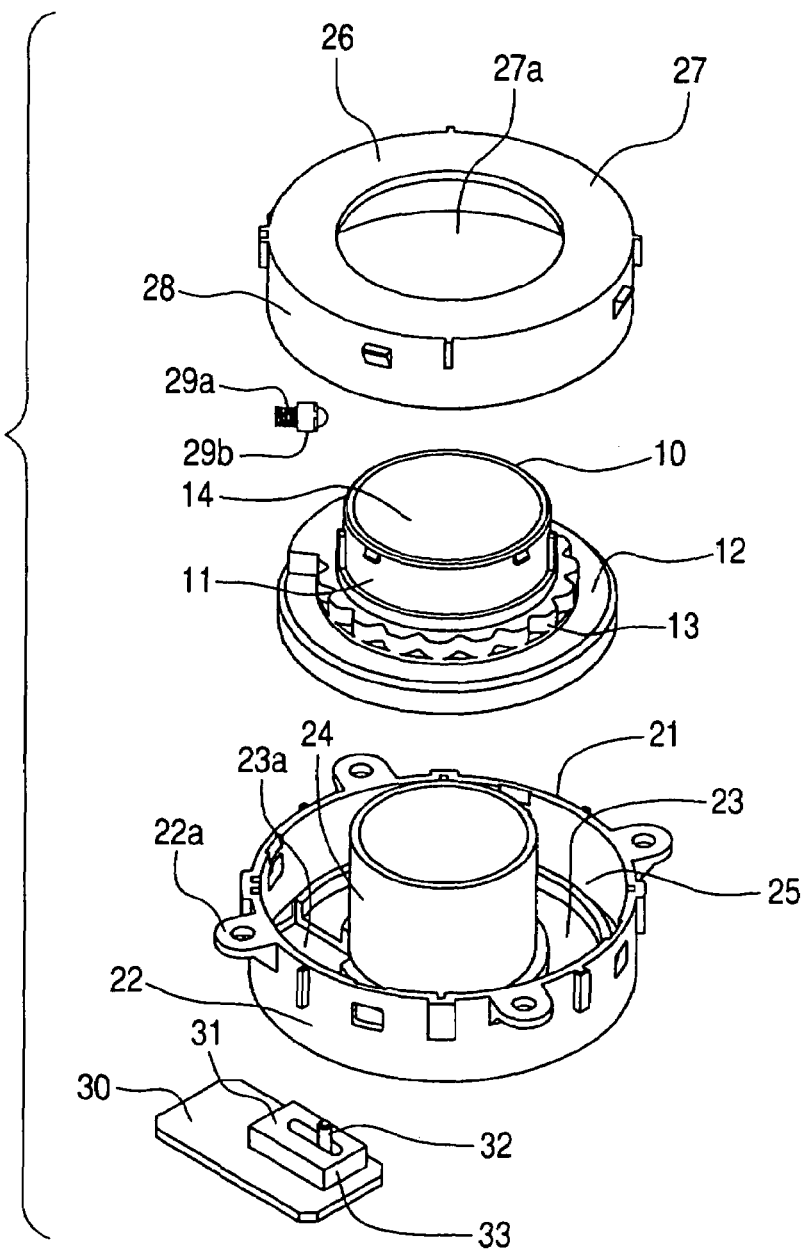

ROTARY ELECTRIC COMPONENT INCLUDING A ROTATABLY SUPPORTING CASE AND OPERATION PANEL USING THE SAME

This application claims the benefit of priority to Japanese Patent Application No. 2004-033955 filed on Feb. 10, 2004, herein incorporated by reference.

BACKGROUND OF THE INVENTION

1. Field of the Invention

The present invention relates to a rotary electric component for outputting a signal corresponding to a rotation angle of a rotary body and to an operation panel using the same, and more particularly, to a rotary electric component including a rotation detecting means for outputting a signal according to a rotation state of the rotary body together with the rotary body and to an operation panel using the same.

2. Description of the Related Art

In recent years, a rotary electric component is used as a temperature control knob for air conditioners in automobiles. The rotary electric component outputs a signal corresponding to a rotation angle of a rotary body when the rotary body is rotated. In this case, a main body of the air conditioner controls temperature based on the signal.

For example, a conventional rotary electric component disclosed in Japanese Unexamined Patent Application Publication No. 2001-243848 has a cylindrical rotary body and a case for rotatably supporting and accommodating the rotary body, respectively. A flange portion is attached to a lower end of the rotary body, and a contactor is mounted on a lower surface of the flange portion. Further, an opening is formed in the lower surface of the case, and a substrate is mounted on a lower portion of the case so as to close the opening. In addition, a circular arc-shaped conductive pattern composed of a code pattern is formed on the substrate, and the substrate is mounted to the case through the opening. Therefore, when the rotary body is rotated, the contactor slide-contacts with the conductive pattern to generate a pulse signal, so that the rotation angle of the rotary body is detected.

However, the above-mentioned conventional rotary electric component needs a conductive pattern having a size corresponding to the movement range of the contactor. That is, in the above-mentioned conventional rotary electric component, when the rotation angle range of the rotary body increases, the movement range of the contactor increases, so that a large conductive pattern is required. Thus, the substrate on which the conductive pattern is arranged is required to have a large size.

SUMMARY OF THE INVENTION

Accordingly, the present invention has been made to solve the above-mentioned problems, and it is an object of the present invention to provide a rotary electric component capable of miniaturizing a substrate regardless of a rotation angle range of a rotation body and an operation panel using the same.

In order to achieve the above-mentioned object, according to a first aspect of the present invention, there is provided a rotary electric component comprising a rotary body having a cylindrical operation portion, a case for rotatably supporting the rotary body, a rotation detecting means operating together with the rotary body, and a substrate on which the rotation detecting means is mounted, wherein the rotation detecting means is liked with the rotation body such that the rotation detecting means operates by the rotation of the rotary body, and outputs a signal corresponding to a rotation angle of the rotary body.

According to a second aspect of the present invention, there is provided a rotary electric component comprising a rotary body having a cylindrical operation portion, a case for rotatably supporting the rotary body, a rotation detecting means operating together with the rotary body, and a substrate on which the rotation detecting means is mounted, wherein a guide groove having a continuously variable distance from a center of rotation of the rotary body is formed in a bottom surface of the rotary body, and the rotary detecting means of the substrate has a sliding portion fitted to the guide groove of the rotary body to slide according to the rotation of the rotary body, and outputs a signal according to a movement location of the sliding portion.

According to a third aspect of the present invention, in the rotary electric component, the rotary body has a cam portion which comes into contact with an elastic member integrally formed in a circumferential direction around a rotation axis of the rotary body.

According to a fourth aspect of the present invention, in the rotary electric component, the rotary body has a flange portion formed in the case to extend in a diameter direction around the rotation axis of the rotary body, a cam portion is provided at an outer circumference of an upper side of the flange portion, the case has a trigger means, and an elastic accommodation portion for accommodating an elastic member which comes into contact with the cam portion of the rotary body is provided substantially parallel to the flange portion of the rotary body.

According to a fifth aspect of the present invention, there is provided an operation panel comprising the rotary electric component and a panel body having an opening which an operation portion of the rotary body passes through. A panel mounting portion is provided at an upper end of the case, and the case is fixed to the panel body through the panel mounting portion.

According to a sixth aspect of the present invention, in the rotary electric component, the rotary body has a flange portion formed in the case to extend in a diameter direction around a rotation axis, and the guide groove is formed in a bottom surface of the flange portion.

According to a seventh aspect of the present invention, in the rotary electric component, the case has a circular-pan-shaped case body having an opening into which the rotation detecting means is inserted, and the substrate is formed to be larger than the opening and is attached to the case so as to close the opening.

According to the rotary electric component of the present invention, the rotation detecting means is linked with the rotation body such that the rotation detecting means operates by the rotation of the rotary body, and outputs a signal corresponding to a rotation angle of the rotary body. Therefore, since the rotation detecting means operates to detect the rotation state of the rotary body, the size of the rotation detecting means does not depend on the rotation angle range of the rotary body, so that the rotation detecting means can be miniaturized. Thus, the substrate on which the rotation detecting means is arranged can be miniaturized.

According to the rotary electric component according to the present invention, a guide groove whose distance from the center of rotation of the rotary body is continuously changed is formed in a bottom surface of the rotary body, and the rotary detecting means of the substrate has a sliding portion fitted to the guide groove of the rotary body to slide according to the rotation of the rotary body, and outputs a signal according to a movement location of the sliding portion. Therefore, it is possible to freely set the rotation angle range of the rotary body according to the formation range of the guide groove.

According to the rotary electric component according to the present invention, the rotary body has a cam portion that comes into contact with an elastic member integrally formed in a circumferential direction around a rotation axis of the rotary body. Therefore, by changing the rotary body, both the operation characteristic determined by the guide groove and the feeling characteristic determined by the cam portion can be simply changed according to application.

According to the rotary electric component according to the present invention, the rotary body has a flange portion formed in the case so as to extend in a diameter direction around the rotation axis of the rotary body, a cam portion is provided at an outer circumference of an upper side of the flange portion, the case has a trigger means, and an elastic accommodation portion for accommodating an elastic member which comes into contact with the cam portion of the rotary body is provided substantially parallel to the flange portion of the rotary body. Therefore, a click feeling can be generated by the rotation of the rotary body, and the space of the upper side of the flange portion can be effectively used. Therefore, it is possible to minimize an increase in size of the case having a click mechanism.

According to the operation panel according to the present invention, a panel mounting portion is provided at an upper end of the case, and the case is fixed to the panel body through the panel mounting portion. Therefore, the number of components interposed between the rotary body and the panel body decreases, so that a cumulative error between the rotary body and the panel body decreases. Thus, the positioning accuracy of the rotary body with respect to the panel body can increase.

According to the rotary electric component of the present invention, the rotary body has a flange portion provided in the case so as to extend in a diameter direction around a rotation axis, and the guide groove is formed in a bottom surface of the flange portion. Therefore, since it is possible to increase the distance of the guide groove from the center of rotation, a distance variation of the guide groove from the center of rotation increases. Thus, it is possible to detect a slight rotation of the rotary body.

Further, according to the rotary electric component of the present invention, the case has a circular-pan-shaped case body having an opening into which the rotation detecting means is inserted, and the substrate is formed to be larger than the opening and is attached to the case so as to close the opening. Therefore, the opening is closed by the substrate, so that it is possible to prevent the infiltration of dust from the outside of the case body.

BRIEF DESCRIPTION OF THE DRAWINGS

FIG. 1 is a perspective view of a rotary electric component according to a first embodiment of the present invention;

FIG. 2 is an exploded perspective view of the rotary electric component according to the first embodiment of the present invention;

DESCRIPTION OF THE PREFERRED EMBODIMENTS

Figure 3:
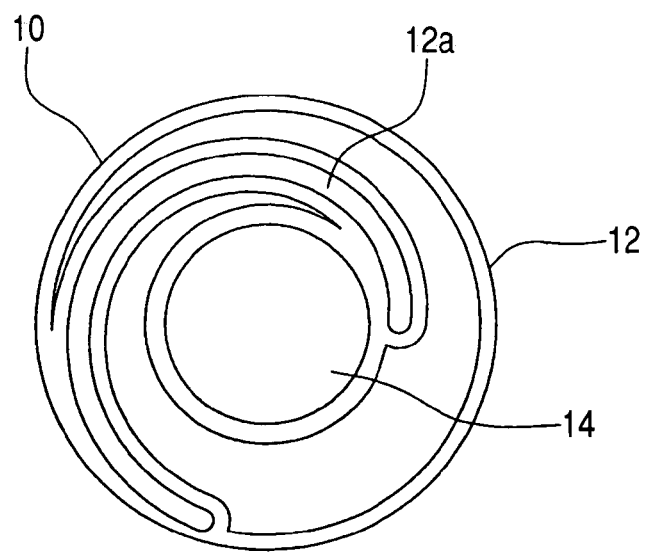
FIG. 3 is a bottom view of a rotary body according to the first embodiment of the present invention.
Figure 4:
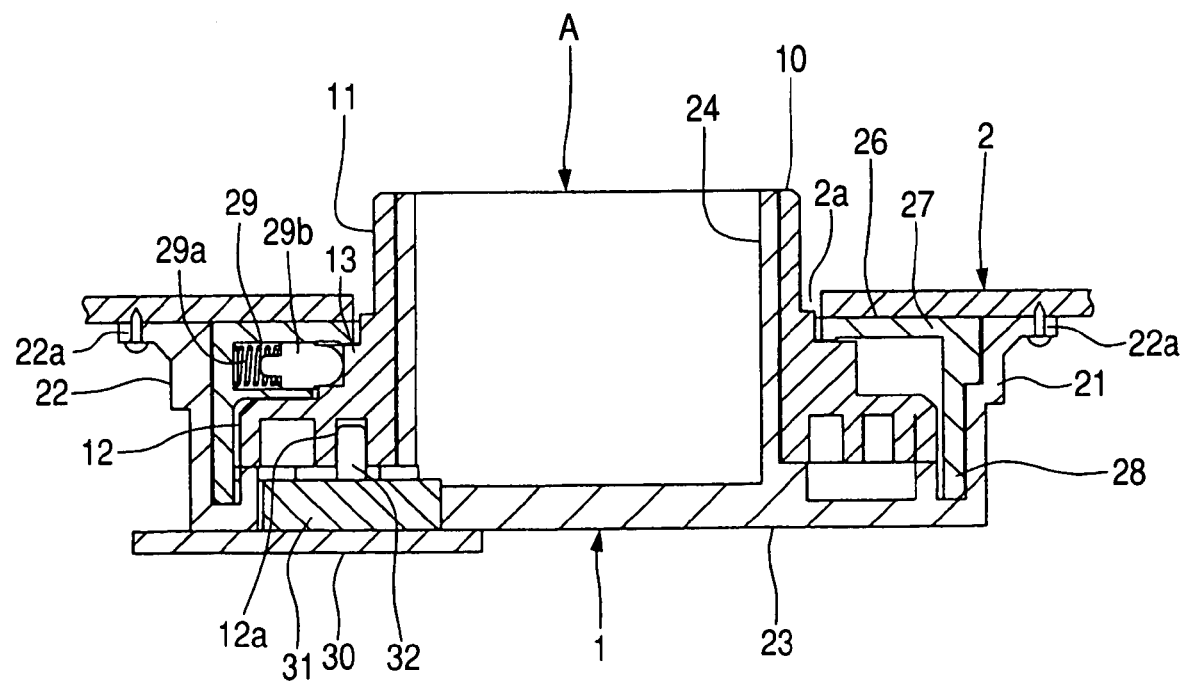
FIG. 4 is a cross-sectional view of the rotary electric component according to the first embodiment of the present invention.

Embodiments of the present invention will now be described with reference to the accompanying drawings. First, the first embodiment of the present invention will be described. FIG. 1 is a perspective view of a rotary electric component according to the first embodiment of the present invention; FIG. 2 is an exploded perspective view of the rotary electric component according to the first embodiment of the present invention; FIG. 3 is a bottom view of a rotary body according to the first embodiment of the present invention; and FIG. 4 is a cross-sectional view of the rotary electric component according to the first embodiment of the present invention.

A rotary electric component 1 according to the first embodiment is used as, for example, a temperature control knob for an air conditioner in an automobile. As shown in FIG. 1, the rotary electric component 1 comprises a rotary body 10, a case 20 which accommodates the rotary body 10 therein and rotatably supports the rotary body 10, and a substrate 30 attached to a lower portion of the case 20.

As shown in FIG. 2, the rotary body 10 includes a cylindrical operation portion 11 which is exposed to the outside of the case 20, a flange portion 12 provided to a lower end of the rotary body 10 so as to extend in a diameter direction around a rotation axis, and a cam portion 13 continuously integrally provided on an upper side of the flange portion 12 in a circumferential direction around the rotation axis so as to protrude from the operation portion 11 in an uneven shape. The cam portion 13 comes into contact with an elastic member 29b, which will be described below. In addition, a cylindrical through hole 14 is formed at a central portion of the case 20, and the rotary body 10 is pivotally supported by the case 20 through the through hole 14 to freely rotate. In addition, if necessary, an operation knob can be attached to the operation portion 11 such that an operator easily performs a rotation operation.

In addition, a circular arc-shaped guide groove 12a in which a distance from the center of rotation of the rotary body in the diameter direction gradually decreases from a starting point to an end point (the distance increases when a reverse rotation is performed) is formed in a bottom surface of the flange portion 12, as shown in FIG. 3. The guide groove 12a is formed to have a length corresponding to the rotation angle range of the rotation body 10. In other words, when the rotation angle range necessary for the rotation body 10 is 250 degrees, the guide groove 12a is formed so as to have a length in which its central angle is 250 degrees. Further, similarly, the above-mentioned cam portion 13 is formed in a range corresponding to the rotation angle range of the rotation body 10.

As shown in FIGS. 1 and 2, the case 20 for accommodating the rotary body 10 has mainly a case body 21 having a circular pan shape and an upper lid portion 26 for covering the rotary body 10 after the rotary body 10 is accommodated in the case body 21.

The case body 21 has a cylindrical sidewall portion 22 and a bottom surface portion 23 for covering the bottom surface of the sidewall portion 22. In addition, the bottom surface portion 23 has a cylindrical supporting portion 24 provided at substantially its central portion for rotatably supporting the rotary body 10, and the sidewall portion 22, the bottom surface portion 23, and the supporting portion 24 constitute an accommodation portion 25, which is a space for accommodating the rotary body 10. Since the rotary body 10 is accommodated in the accommodation portion 25 in a state in which the supporting portion 24 is inserted into the through hole 14, the rotary body 10 is freely rotatable in the case body 21.

In addition, a rectangular opening 23a is formed in the bottom surface portion 23 of the case body 21, and a linear position sensor 31, which will be described later, is arranged in the opening 23a.

Further, the upper lid portion 26 includes an upper surface portion 27 having an opening portion 27a passing through the operation portion 11 of the rotary body 10 at substantially the center thereof and an inner wall portion 28 inscribed with the sidewall portion 22 of the case body 21. The upper lid portion 26 tightly closes the upper portion of the case 20, so that it is possible to ensure the dust resistance of the rotary electric component 1.

As shown in FIG. 4, in the upper lid portion 26, a circular hole-shaped elastic accommodation portion 29 whose inside has an opening is formed along the diameter direction at a height facing the cam portion 13 of the rotary body 10, that is, at the upper side of the flange portion 12 of the rotary body 10, and a coil spring 29a, serving as a trigger means, and an elastic member 29b which is biased inward in the diameter direction by the coil spring 29a are accommodated in the elastic accommodating portion 29. The elastic member 29b is biased by the coil spring 29a to come into contact with the cam portion 13 of the rotary body 10. In addition, when the rotary body 10 is rotated, the cam portion 13 is rotated. As a result, the elastic member 29b passes a convex portion of the cam portion 13 to generate a click feeling.

In this way, a click mechanism is provided, so that the feeling of the rotation operation can be given to the operator. In addition, the cam portion 13 and the elastic accommodation portion 29 facing the cam portion 13 are formed on the flange portion 12 of the rotary body 10, so that a space in the case 20 can be effectively used. As a result, it is possible to minimize an increase in the size of the case 20 due to the installation of the click mechanism.

In addition, the trigger means or elastic member is not limited to the above-mentioned examples. That is, any means or member which can pass the convex portion of the cam portion 13 by means of the elasticity to generate the click feeling by using a plate spring, etc., can be used.

As shown in FIGS. 2 and 4, the substrate 30 attached to the lower portion of the case 20 is formed to be larger than the opening portion 23a so as to cover the opening portion 23a formed in the bottom surface portion 23 of the case body 21, and the substrate 30 is attached to the lower portion of the case 20 so as to close the opening 23a. In addition, a linear position sensor 31 serving as a rotation detecting means is arranged at a location facing the opening 23a of the substrate 30 and is arranged in the accommodation portion 25 so as to face the bottom surface of the flange portion 12 of the rotary body 10 through the opening 23a. The linear position sensor 31 has a rod-shaped slider 32 fitted into the guide groove 12a of the rotary body 10 and a guide portion 33 for guiding the movement direction of the slider 32. Further, the slider 32 operates together with a variable resistor provided in the linear position sensor 31. Therefore, with the movement of the slider 32, a resistance value of the variable resistor is changed. In addition, the slider 32 comes into contact with both ends of the guide groove 12a, so that the slider 32 functions to regulate the rotation angle range of the rotation body 10.

According to the present embodiment, the guide groove 12a is formed such that the distance from the center of rotation of the rotary body in the diameter direction decreases gradually. Therefore, when the rotary body 10 is rotated in one direction, the slider 32 also moves only in one direction. As a result, since the resistance value of the variable resistor of the linear position sensor 31 monotonically increases or decreases, an output voltage output from the linear position sensor 31 also monotonically increases or decreases, so that the process can be easier.

In addition, since the opening 23a formed in the bottom surface portion 23 of the case body 21 is closed by the substrate 30, the lower portion of the case 20 is substantially closed. Therefore, it is possible to ensure the dust resistance of the rotary electric component 1.

In the rotary electric component 1 having the above-mentioned structure, when the rotary body 10 is rotated, the location of the guide groove 12a of the rotary body 10 with respect to the slider 32 of the linear position sensor 31 is changed in the diameter direction, and the slider 32 moves in one direction while the movement direction of the slider 32 is regulated by the guide portion 33 according to the change of the guide groove 12a. In addition, the resistance value of the variable resistor provided in the linear position sensor 31 is changed by the movement of the slider 32, so that the output voltage output from the linear position sensor 31 is changed. Temperature control can be performed by making the output voltage correspond to the temperature of the air conditioner and the like.

As such, since the slider 32 of the linear position sensor 31 serving as a rotation detecting means is operated to detect the rotation state of the rotary body 10, the size of the rotation detecting means does not depend on the rotation angle range of the rotary body 10. In addition, since it is not necessary to provide the rotation detecting means having the size according to the rotation angle range of the rotary body 10 as in the conventional conductive pattern, the substrate 30 can be miniaturized.

According to the present embodiment, the guide groove 12a is formed in the bottom surface of the rotary body 10, and the linear position sensor 31 having the slider 32 fitted into the guide groove 12a as the rotation detecting means is used. Therefore, the rotation angle range of the rotary body 10 can be freely set according to the guide groove 12a forming range.

As shown in FIG. 4, when the rotary electric component 1 is incorporated into an automobile and the like, a panel body 2 on which the set temperature with regard to the rotation state of the rotary electric component 1 is set is mounted in a state in which the operation portion 11 of the rotary body 10 is inserted into the circular opening 2a and is assembled as an operation panel A. Conventionally, the panel body 2 is mounted on the substrate 30, and the positional relationship between the rotary body 10 and the panel body 2 is determined by the relationship between the substrate 30 and the case body 21 interposed therebetween. However, in the operation panel A according to the present embodiment, panel mounting portions 22a having screw holes are provided at the upper end of the sidewall portion 22 of the case body 21, and the case body 21 is attached to the panel body 2 through the panel mounting portions 22a as shown in FIG. 4. In this way, the positional relationship between the rotary body 10 and the panel body 2 is determined by the relationship between the panel body 2 and the case body 21. In addition, the number of components interposed between the rotary body 10 and the panel body 2 decreases, so that a cumulative error between the rotary body 10 and the panel body 2 decreases. As a result, the positioning accuracy between the opening 2a of the panel body 2 and the operation portion 11 of the rotary body 10 is improved, so that appearance is improved.

Further, according to the present embodiment, the flange portion 12 is provided at the lower end of the rotary body 10, and the guide groove 12a is formed in the bottom surface of the flange portion 12. Therefore, a difference in distance between the rotation center of the rotary body and the starting point and the end point of the guide groove 12a can increase, so that a variation in distance from the rotation center of the guide groove 12a can increase. Thus, a slight rotation of the rotary body 10 can be detected.

Until now, the first embodiment of the present invention has been described. According to the first embodiment, the linear position sensor 31 is used as the rotation detecting means. However, it is also possible to detect the rotation of the rotary body 10 using another rotation detecting means. Hereinafter, a second embodiment of the present invention using another rotation detecting means will be described.

Figure 5:
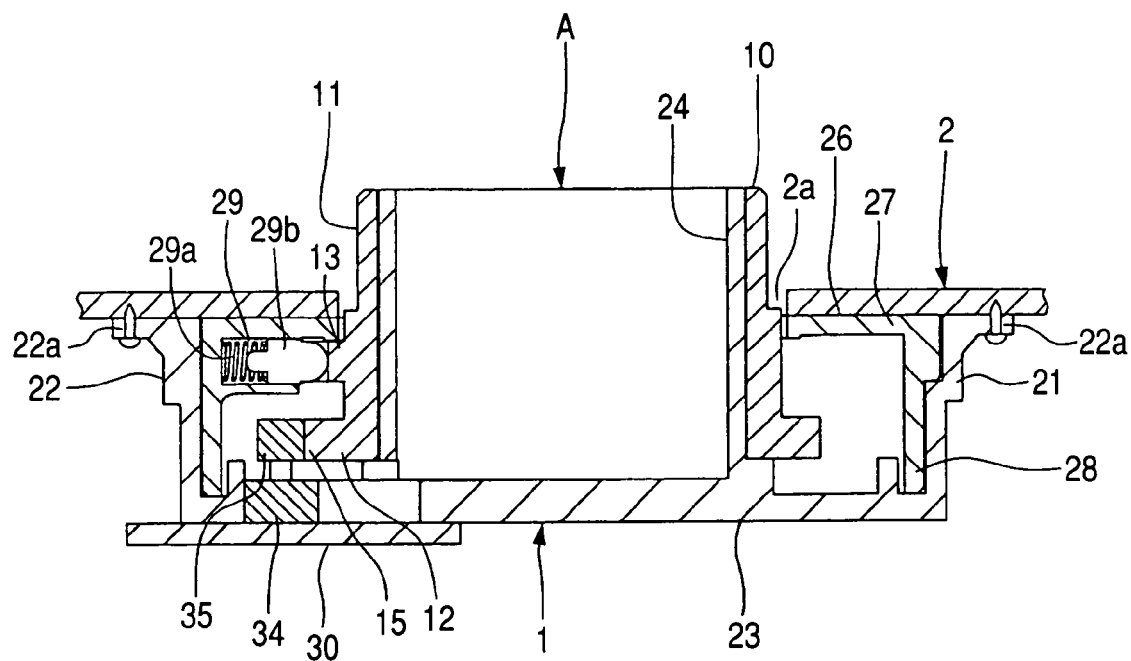
FIG. 5 is a cross-sectional view of a rotary electric component according to a second embodiment of the present invention.

FIG. 5 is a cross-sectional view of a rotary electric component according to the second embodiment of the present invention. A rotary electric component 1 according to the second embodiment is substantially the same as that in the first embodiment, except that a rotation detecting means provided on the substrate 30 and a means for transmitting the rotation of the rotation body 10 to the rotation detecting means are different from those in the first embodiment.

According to the second embodiment, the rotary body 10 has a gear-shaped driving portion 15 provided in an outer circumference of a flange portion 12. In addition, on a substrate 30, a rotation detecting portion 34 having a gear-shaped driven portion 35 and serving as the rotation detecting means is provided. The driving portion 15 of the rotary body 10 and the driven portion 35 of the rotation detecting portion 34 engage with each other to constitute a module. The driven portion 35 operates together with a rotary variable resistor provided in the rotation detecting portion 34. Therefore, when the driven portion 35 is rotated, the resistance value of the variable resistor is changed.

In the rotary electric component 1 having the above-mentioned structure, when the rotary body 10 is rotated, the driven portion 35 is rotated by the rotation of the driving portion 15 due to the rotation of the rotary body 10. As a result, the resistance value of the variable resistor provided in the rotation detecting portion 34 is changed, and the output voltage output from the rotation detecting portion 34 is changed. By associating the temperature of the air conditioner or the like with the output voltage, temperature control can be performed.

As such, the gear-shaped driving portion 15 is provided in the rotary body 10, and the rotation detecting portion 34 having the gear-shaped driven portion 35 engaging with the driving portion 15 is arranged on the substrate 30. Therefore, since the size of the rotation detecting means does not depend on the rotation angle range of the rotary body 10, the rotation detecting means can be miniaturized, so that the substrate 30 can be miniaturized.

Until now, the second embodiment of the present invention has been described. According to the first and second embodiments, the linear position sensor 31 and the rotation detecting portion 34 having the gear-shaped driven portion 35 are used as the rotation detecting means, respectively. However, the rotation detecting means is not limited thereto, but another means, such as an optical sensor, may be used to detect the rotation state of the rotary body 10.

Figure 6:
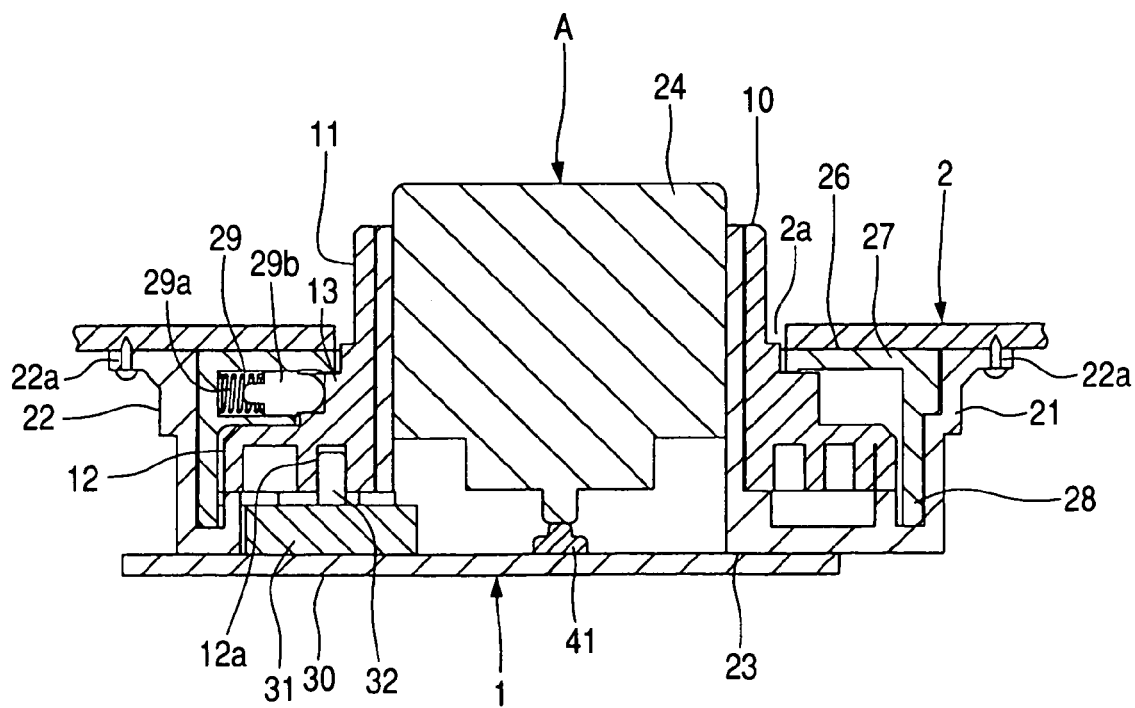
FIG. 6 is a cross-sectional view of a rotary electric component including a push button mechanism.

In addition, according to the first and second embodiments, the miniaturization of the substrate 30 as well as the miniaturization of the rotation detecting means is achieved by using the linear position sensor 31 or the rotation detecting portion 34. However, when the rotation detecting means is miniaturized, an additional mechanism may be provided in an extra space of the substrate 30 without miniaturizing the substrate 30. As shown in FIG. 6, for example, the inside of the supporting portion 24 of the case body 21 may be formed in a through hole shape, and a push button 41 may be arranged at a location corresponding to the inside of the supporting portion 24 on the substrate 30. Further, a pressing operation member 42 may be inserted into the supporting portion 24 from the upper side, and a push button mechanism may be formed in the rotary electric component 1.

Alternatively, instead of the pressing mechanism, an LED for a backlight is arranged at a place where the push button 41 is arranged, such that the LED illuminates an operation knob attached to the operation portion 11.

What is claimed is:

1. A rotary electric component comprising:
   a rotary body having a cylindrical operation portion;
   a case for rotatably supporting the rotary body;
   a rotation detecting means operating together with the rotary body; and
   a substrate on which the rotation detecting means is mounted,
   wherein the rotation detecting means is linked with the rotation body such that the rotation detecting means operates by the rotation of the rotary body, and outputs a signal according to a rotation angle of the rotary body.

2. A rotary electric component comprising:
   a rotary body having a cylindrical operation portion;
   a case for rotatably supporting the rotary body;
   a rotation detecting means operating together with the rotary body; and
   a substrate on which the rotation detecting means is mounted,
   wherein a guide groove having a continuously variable distance from a center of rotation of the rotary body is formed in a bottom surface of the rotary body, and
   the rotary detecting means mounted on the substrate has a sliding portion fitted to the guide groove of the rotary body to slide according to the rotation of the rotary body, and outputs a signal according to a movement location of the sliding portion.

3. The rotary electric component according to claim 2, wherein the rotary body has a cam portion which comes into contact with an elastic member integrally formed in a circumferential direction around a rotation axis of the rotary body.

4. The rotary electric component according to claim 1, wherein the rotary body has a flange portion formed in the case to extend in a diameter direction around a rotation axis of the rotary body,
   a cam portion is provided in an outer circumference of an upper side of the flange portion,
   the case has a trigger means, and
   an elastic accommodation portion for accommodating an elastic member which comes into contact with the cam portion of the rotary body is provided substantially parallel to the flange portion of the rotary body.

5. An operation panel comprising the rotary electric component according to claim 1 and a panel body having an opening which an operation portion of the rotary body passes through, wherein a panel mounting portion is provided at an upper end of the case, and the case is fixed to the panel body through the panel mounting portion.

6. The rotary electric component according to claim 2, wherein the rotary body has a flange portion formed in the case to extend in a diameter direction around a rotation axis, and the guide groove is formed in a bottom surface of the flange portion.

7. The rotary electric component according to claim 1, wherein the case has a circular-pan-shaped case body having an opening into which the rotation detecting means is inserted, and the substrate is formed to be larger than the opening and is mounted to the case so as to close the opening.

* * * * *